US012683252B2

(12) United States Patent
Zhu et al.

(10) Patent No.: US 12,683,252 B2
(45) Date of Patent: Jul. 14, 2026

(54) BATTERY CELL, BATTERY, ELECTRICAL DEVICE, AND MANUFACTURING METHOD AND DEVICE FOR BATTERY CELL

(71) Applicant: JIANGSU CONTEMPORARY AMPEREX TECHNOLOGY LIMITED, Changzhou (CN)

(72) Inventors: Wenqi Zhu, Changzhou (CN); Yuqian Wen, Changzhou (CN); Kun Fang, Changzhou (CN); Rui Yang, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 0 days.

(21) Appl. No.: 18/398,175

(22) Filed: Dec. 28, 2023

(65) Prior Publication Data

US 2024/0128604 A1     Apr. 18, 2024

Related U.S. Application Data

(63) Continuation of application No. PCT/CN2021/125099, filed on Oct. 20, 2021.

(30) Foreign Application Priority Data

Jul. 6, 2021     (WO) ................ PCT/CN2021/104779

(51) Int. Cl.
*H01M 50/531*          (2021.01)
*H01M 10/0587*          (2010.01)
          (Continued)

(52) U.S. Cl.
CPC ..... *H01M 50/536* (2021.01); *H01M 10/0587* (2013.01); *H01M 50/107* (2021.01);
          (Continued)

(58) Field of Classification Search
CPC ............ H01M 50/107; H01M 50/531; H01M 50/533; H01M 50/188; H01M 50/213;
          (Continued)

(56) References Cited

U.S. PATENT DOCUMENTS

| | | | |
|---|---|---|---|
| 6,117,589 A | 9/2000 | Satou et al. | |
| 8,623,545 B2 | 1/2014 | Kim et al. | |

(Continued)

FOREIGN PATENT DOCUMENTS

| | | | |
|---|---|---|---|
| CN | 1694281 A | 11/2005 | |
| CN | 101005127 A | 7/2007 | |

(Continued)

OTHER PUBLICATIONS

The first Office Action received in the corresponding Chinese Application 202110759560.5, mailed Aug. 24, 2021.

(Continued)

*Primary Examiner* — Miriam Stagg
*Assistant Examiner* — Lilia Nedialkova
(74) *Attorney, Agent, or Firm* — K&L Gates LLP

(57)          ABSTRACT

Provided are a battery cell, a battery, an electrical device, and a manufacturing method and device for a battery cell, which belong to the field of battery technologies. The battery cell includes a case, an electrode assembly, an end cover, and a current collecting member. The case has an opening. The electrode assembly is accommodated in the case. The end cover covers the opening and is sealed and connected to the case. The current collecting member is accommodated in the case and located at a side of the electrode assembly facing the end cover. The current collecting member is configured to connect the case and the electrode assembly to electrically connect the electrode assembly to the case. The battery cell (Continued)

with such structure realizes an electrical connection between the electrode assembly and the case through the current collecting member.

10 Claims, 6 Drawing Sheets

(51) Int. Cl.

| | |
|---|---|
| *H01M 50/107* | (2021.01) |
| *H01M 50/188* | (2021.01) |
| *H01M 50/213* | (2021.01) |
| *H01M 50/247* | (2021.01) |
| *H01M 50/249* | (2021.01) |
| *H01M 50/342* | (2021.01) |
| *H01M 50/536* | (2021.01) |
| *H01M 50/559* | (2021.01) |
| *H01M 50/308* | (2021.01) |

(52) U.S. Cl.
CPC ....... *H01M 50/188* (2021.01); *H01M 50/213* (2021.01); *H01M 50/247* (2021.01); *H01M 50/249* (2021.01); *H01M 50/3425* (2021.01); *H01M 50/531* (2021.01); *H01M 50/559* (2021.01); *H01M 50/308* (2021.01); *H01M 2220/20* (2013.01); *H01M 2220/30* (2013.01)

(58) Field of Classification Search
CPC ............. H01M 50/247; H01M 50/249; H01M 50/308; H01M 50/3425; H01M 50/536; H01M 50/559; H01M 10/0587; H01M 2220/20; H01M 2220/30; Y02E 60/10; Y02P 70/50
See application file for complete search history.

(56) References Cited

U.S. PATENT DOCUMENTS

| | | | |
|---|---|---|---|
| 9,490,079 B2 | 11/2016 | So et al. | |
| 9,564,626 B2 | 2/2017 | Kim | |
| 10,256,455 B2 | 4/2019 | Yoo et al. | |
| 2001/0007729 A1 | 7/2001 | Kitoh et al. | |
| 2002/0089306 A1 | 7/2002 | Kubale et al. | |
| 2005/0048365 A1* | 3/2005 | Miyahisa ............ | H01M 50/566 |
| | | | 29/623.2 |
| 2005/0238951 A1 | 10/2005 | Yoo et al. | |
| 2005/0287433 A1 | 12/2005 | Kim | |
| 2006/0063063 A1 | 3/2006 | Mori | |
| 2010/0233528 A1 | 9/2010 | Kim et al. | |
| 2014/0349149 A1 | 11/2014 | Kim | |
| 2015/0279574 A1 | 10/2015 | So et al. | |
| 2017/0098813 A1 | 4/2017 | Yoo et al. | |
| 2020/0196450 A1 | 6/2020 | Nestle | |
| 2022/0231345 A1 | 7/2022 | Hwangbo et al. | |
| 2022/0271405 A1* | 8/2022 | Min .................... | H01M 50/242 |
| 2023/0246244 A1 | 8/2023 | Hwangbo et al. | |
| 2023/0327303 A1 | 10/2023 | Kim | |
| 2024/0136664 A1* | 4/2024 | Jo ....................... | H01M 50/186 |

FOREIGN PATENT DOCUMENTS

| | | |
|---|---|---|
| CN | 101834304 A | 9/2010 |
| CN | 102916159 A | 2/2013 |
| CN | 203826461 U | 9/2014 |
| CN | 104952635 A | 9/2015 |
| CN | 104953190 A | 9/2015 |
| CN | 205319258 U | 6/2016 |
| CN | 106560939 A | 4/2017 |
| CN | 106910932 A | 6/2017 |
| CN | 207398190 U | 5/2018 |
| CN | 208062214 U | 11/2018 |
| CN | 209133626 U | 7/2019 |
| CN | 110379943 A | 10/2019 |
| CN | 209786120 U | 12/2019 |
| CN | 111384353 A | 7/2020 |
| CN | 112072058 A | 12/2020 |
| CN | 112290167 A | 1/2021 |
| CN | 112310569 A | 2/2021 |
| CN | 112310574 A | 2/2021 |
| CN | 112510244 A | 3/2021 |
| CN | 112510326 A | 3/2021 |
| CN | 112701422 A | 4/2021 |
| CN | 112909445 A | 6/2021 |
| CN | 113097607 A | 7/2021 |
| CN | 113258124 A | 8/2021 |
| CN | 216120648 U | 3/2022 |
| EP | 1595298 B1 | 9/2010 |
| EP | 2924762 A2 | 9/2015 |
| EP | 4044334 A2 | 8/2022 |
| EP | 4199206 A1 | 6/2023 |
| GB | 1206627 A | 9/1970 |
| JP | H1167279 A | 3/1999 |
| JP | 2000106165 A | 4/2000 |
| JP | 2004362956 A | 12/2004 |
| JP | 2005129433 A | 5/2005 |
| JP | 2008066040 A | 3/2008 |
| JP | 2012124007 A | 6/2012 |
| JP | 2019083151 A | 5/2019 |
| JP | 2024500670 A | 1/2024 |
| JP | 2024514664 A | 4/2024 |
| JP | 2024529315 A | 8/2024 |
| KR | 100670526 B1 | 1/2007 |
| KR | 1020130006274 A | 1/2013 |
| KR | 1020150120261 A | 4/2014 |
| WO | 2017213352 A1 | 12/2017 |
| WO | 2022158864 A2 | 7/2022 |
| WO | 2022177371 A1 | 8/2022 |
| WO | 2022223531 A1 | 10/2022 |

OTHER PUBLICATIONS

The first Office Action received in the corresponding Chinese Application 202111399402.X, mailed May 24, 2023.
The second Office Action received in the corresponding Chinese Application 202111399402.X, mailed Aug. 17, 2023.
The first Office Action received in the corresponding Chinese Application 202111409269.1, mailed May 23, 2023.
The first Office Action received in the corresponding Chinese Application 202111398785.9, mailed May 24, 2023.
The extended European search report received in the corresponding European Application 21806119.0, mailed Oct. 5, 2023.
International Search Report received in the corresponding International Application PCT/CN2022/104779, mailed Mar. 28, 2022.
Written Opinion received in the corresponding International Application PCT/CN2022/104779, mailed Mar. 28, 2022.
International Search Report received in the corresponding International Application PCT/CN2022/125099, mailed Mar. 28, 2022.
Written Opinion received in the corresponding International Application PCT/CN2022/125099, mailed Mar. 28, 2022.
Notice of Reasons for Refusal received in the corresponding Japanese Application 2023-547133, mailed on Sep. 2, 2024.
Notice of Reasons for Refusal received in the corresponding Japanese Application 2023-536182, mailed on Jul. 1, 2024.
Non-Final Office Action received in the corresponding U.S. Appl. No. 17/554,466, mailed on Sep. 5, 2024.
The extended European search report received in the counterpart European application 24190325.1, issued on Oct. 25, 2024.
The Decision to Grant a Patent received in the counterpart Japanese application 2023-547133, issued on Dec. 9, 2024.
The Decision to Grant a Patent received in the counterpart Japanese application 2023-536182, issued on Dec. 2, 2024.
Extended European Search Report issued to related EP Application No. 21949060.4, Apr. 2, 2025, 7 pages.
Office Action issued to related KR Application No. 10-2023-7019717, dated Mar. 20, 2025, 33 pages (with English translation).
Office Action issued to related U.S. Appl. No. 17/554,466, dated Feb. 3, 2025, 38 pages.

(56)     References Cited

OTHER PUBLICATIONS

Office Action issued to related KR Application No. 10-2023-7026248, dated Mar. 25, 2025, 17 pages (with English translation).
The first Office Action received in the CN counterpart application 202180072351.1, dated Jul. 11, 2025, 20 pages with English translation.
The Final Office Action received in the counterpart U.S. Appl. No. 17/554,466, dated Sep. 4, 2025, 34 pages.
The Non-Final Office Action received in the counterpart U.S. Appl. No. 17/554,466, dated Dec. 29, 2025, 22 pages.
The first Office Action received in the counterpart EP Application No. 24190325.1, dated Mar. 17, 2026, 7 pages.

* cited by examiner

10

BATTERY CELL, BATTERY, ELECTRICAL DEVICE, AND MANUFACTURING METHOD AND DEVICE FOR BATTERY CELL

CROSS-REFERENCE TO RELATED APPLICATIONS

The present application is a continuation of International Application PCT/CN2021/125099, filed Oct. 20, 2021, which claims priority to International Patent Application No. PCT/CN2021/104779 entitled "BATTERY CELL, BATTERY, ELECTRICAL DEVICE, AND MANUFACTURING METHOD AND DEVICE FOR BATTERY CELL" filed on Jul. 6, 2021, which are incorporated herein by reference in their entireties.

TECHNICAL FIELD

The present application relates to the field of battery technologies, and in particular, to a battery cell, a battery, an electrical device, and a manufacturing method and device for a battery cell.

BACKGROUND ART

Lithium ion batteries are commonly used in vehicles. As a rechargeable battery, the lithium ion battery has advantages such as small size, high energy density, high power density, large number of recycling times, and long storage time.

A battery cell generally includes a case and an electrode assembly. The case is used for accommodating the electrode assembly and an electrolyte solution. The electrode assembly generally includes a positive electrode sheet and a negative electrode sheet, and electric energy is generated by metal ions (such as lithium ions) moving between the positive electrode sheet and the negative electrode sheet.

For a general battery cell, the electrode assembly needs to be electrically connected to the case so that the case may be used as a positive output electrode or negative output electrode of the battery cell. At present, it is inconvenient to realize an electrical connection between the electrode assembly and the case.

SUMMARY OF THE INVENTION

Embodiments of the present application provides a battery cell, a battery, an electrical device, and a manufacturing method and device for a battery cell, which is capable of more conveniently realizing an electrical connection between an electrode assembly and a case.

In a first aspect, a battery cell is provided in an embodiment of the present application, which includes: a case having an opening; an electrode assembly accommodated in the case; an end cover covering the opening and sealed and connected to the case; and a current collecting member accommodated in the case and located on a side of the electrode assembly facing the end cover. The current collecting member is configured to connect the case and the electrode assembly, so that the electrode assembly is electrically connected to the case.

In the above technical solution, the current collecting member is located at the side of the electrode assembly facing the end cover, the electrode assembly is electrically connected to the case through the current collecting member, the end cover covers the opening of the case, and the end cover is sealed and connected to the case. This structure enables the current collecting member to be connected to the case in an interior of the case during assembling of the battery cell. After the current collecting member is connected to the electrode assembly and the case, the end cover then covers the opening of the case and is sealed and connected to the case, so that the electrical connection between the electrode assembly and the case is more convenient.

In some embodiments, the current collecting member is welded to the case.

In the above technical solution, the current collecting member is welded to the case, and a connection method between the current collecting member and the case is simple, which is capable of ensuring the firmness of the connection between the current collecting member and the case, and realize a stable over-current between the current collecting member and the case.

In some embodiments, the current collecting member is welded to the case to form a welded portion, the welded portion is used for fixing the current collecting member and the case, and the welded portion is located in the interior of the case.

In the above technical solution, the welded portion formed by welding the current collecting member and the case is located in the interior of the case, which reduces a risk of damage to an outer layer structure of the case due to the welded portion being located on an outer side of the case during a welding process of the current collecting member and the case, reduces a risk of corrosion of the case, and improves a service life of the battery cell.

In some embodiments, a first position-limit portion is protruded on an inner side surface of the case, and the first position-limit portion is used for limiting the end cover from moving in a direction facing the electrode assembly; and the current collecting member is welded to the first position-limit portion.

In the above technical solution, the first position-limit portion plays a limiting role on the end cover, and the end cover is capable of being limited by the first position-limit portion from moving in the direction facing the electrode assembly. The current collecting member is welded on the first position-limit portion which plays the limiting role on the end cover, and the first position-limit portion is effectively used to facilitate the welding and fixation of the current collecting member.

In some embodiments, the current collecting member includes a body part for connecting to the electrode assembly, the body part being located on a side of the first position-limit portion facing the electrode assembly, and the first position-limit portion being used for limiting the body part from leaving the case in a direction away from the electrode assembly.

In the above technical solution, the first position-limit portion plays a limiting role on the body part. The first position-limit portion is capable of limiting the body part from leaving the case in the direction away from the electrode assembly. The first position-limit portion is capable of separating the end cover and the body part. The body part is less likely to affect the sealing of the end cover and the case, thereby ensuring the sealing between the end cover and the case.

In some embodiments, the body part abuts against the side of the first position-limit portion facing the electrode assembly and is welded to the first position-limit portion.

In the above technical solution, the body part abuts against the side of the first position-limit portion facing the electrode assembly and is welded to the first position-limit portion, so that the whole current collecting member has good firmness after being fixed to the first position-limit portion, and a contact area between the current collecting member and the first position-limit portion is increased, so as to increase an overcurrent area between the case and the current collecting member.

In some embodiments, the current collecting member further includes an elastic portion connected to the body part, the elastic portion abutting against the first position-limit portion and being welded to the first position-limit portion.

In the above technical solution, the elastic portion of the current collecting member abuts against the first position-limit portion and is welded to the first position-limit portion. The elastic portion is capable of generating elastic deformation according to a change of a distance between the body part and the first position-limit portion, thereby reducing a risk of a failure of the electrical connection between the body part and the electrode assembly as the electrode assembly moves due to vibration of the battery cell in the case.

In some embodiments, the elastic portion is a leaf spring bent and arranged on the body part.

In the above technical solution, the elastic portion is a leaf spring bent and arranged on the body part, which has a simple structure and good deformation capacity.

In some embodiments, the current collecting member further includes: a first connecting portion connected to the body part, the first connecting portion at least partially extends to an inner peripheral side of the first position-limit portion, and the first connecting portion is welded to the first position-limit portion.

In the above technical solution, the first connecting portion of the current collecting member extends at least partially to the inner peripheral side of the first position-limit portion, and the first connecting portion is welded to the first position-limit portion, thereby reducing the difficulty in welding the current collecting member to the first position-limit portion.

In some embodiments, the first connecting portion is a convex portion extending from the body part in a direction away from the electrode assembly, and the convex portion is used for forming a positioning fit with an inner peripheral surface of the first position-limit portion.

In the above technical solution, the first connecting portion is a convex portion that forms a positioning fit with the inner peripheral surface of the first position-limit portion, and the convex portion forms the positioning fit with the inner peripheral surface of the first position-limit portion, which reduces a risk of shaking of the current collecting member during the welding process between the first connecting portion and the first position-limit portion, reduces the difficulty in welding, and improves the firmness of the first connecting portion and the first position-limit portion after the welding. At the same time, the contact area between the case and the current collecting member is increased, so as to increase the overcurrent area between the case and the current collecting member.

In some embodiments, the body part has an inner surface facing the electrode assembly and an outer surface away from the electrode assembly, and the convex portion extends from the outer surface in a direction away from the electrode assembly. The current collecting member further includes a concave portion, which is recessed from the inner surface to the convex portion in the direction away from the electrode assembly.

In the above technical solution, the current collecting member is provided with the concave portion which is recessed from the inner surface of the body part to the convex portion in the direction away from the electrode assembly. On the one hand, the material of the current collecting member is reduced and the manufacturing cost is reduced. On the other hand, the deformation ability of the convex portion is improved, so that the convex portion elastically abuts against the first position-limit portion, thereby ensuring a good contact between the convex portion and the first position-limit portion.

In some embodiments, the convex portion and the concave portion are annular structures extending in a circumferential direction of the first position-limit portion.

In the above technical solution, both the convex portion and the concave portion are annular structures extending in the circumferential direction of the first position-limit portion, so that the convex portion has a better deformation ability.

In some embodiments, in the direction in which the first connecting portion extends from the body part in the direction away from the electrode assembly, an end of the first connecting portion away from the body part does not exceed the first position-limit portion.

In the above technical solution, the end of the first connecting portion away from the body part does not exceed the first position-limit portion, and the first connecting portion is less likely to interfere with the end cover, so as to ensure the sealing between the end cover and the case.

In some embodiments, the first connecting portion is welded to the inner peripheral surface of the first position-limit portion, the inner peripheral surface has a boundary position, and a radial dimension of the inner peripheral surface gradually increases from the boundary position to both ends of the inner peripheral surface. In the direction that the first connecting portion extends from the body part in the direction away from the electrode assembly, the end of the first connecting portion away from the body part exceeds the boundary position.

In the above technical solution, the end of the first connecting portion away from the body part exceeds the boundary position, so that a welded joint is formed between an outer peripheral surface of the first connecting portion and the first position-limit portion, which is convenient for welding and fixing the first connecting portion and the first position-limit portion, and ensures the firmness of the first connecting portion and the first position-limit portion after the welding.

In some embodiments, the first connecting portion includes: an extension section connected to the body part, the extension section extends from the body part in the direction away from the electrode assembly, and the extension section extends at least partially to an inner peripheral side of the first position-limit portion. The position-limit section is connected to the extension section, and the position-limit section abuts against the side of the first position-limit portion away from the electrode assembly and is welded to the first position-limit portion.

In the above technical solution, the position-limit section abuts against the side of the first position-limit portion away from the electrode assembly and is welded to the first position-limit portion. The position-limit section plays a position limiting role, improves the firmness of the current collecting member after being welded to the first position-limit portion, increases the contact area between the current collecting member and the first position-limit portion, and increases the overcurrent area between the case and the current collecting member.

In some embodiments, the first position-limit portion is an annular structure extending in a circumferential direction of the case.

In the above technical solution, the first position-limit portion is the annular structure, which is easy to form and manufacture. The first position-limit portion is capable of limiting the end cover at the whole circumference, thereby ensuring the position-limit capability of the first position-limit portion to the end cover.

In some embodiments, a roll groove is arranged at a position corresponding to the first position-limit portion on an outer side surface of the case.

In the above technical solution, the outer side surface of the case is provided with the roll groove. In the process of forming the roll groove, the case will form the first position-limit portion at the position corresponding to the roll groove, which is capable of simplifying a forming process of the first position-limit portion.

In some embodiments, the battery cell further includes a sealing member. The end cover and the case are sealed and connected through the sealing member.

In the above technical solution, the end cover is sealed and connected to the case through the sealing member to ensure the sealing performance of the end cover and the case.

In some embodiments, the sealing member is configured to insulate and isolates the case from the end cover.

In the above technical solution, the sealing member insulates and isolates the case from the end cover. The sealing member plays a role of both sealing and insulation between the case and the end cover, thereby reducing a risk of electrification of the end cover while ensuring the sealing performance of the end cover and the case.

In some embodiments, the sealing member is configured to clad the end cover in a circumferential direction of the opening.

In the above technical solution, the sealing member clads the end cover in the circumferential direction of the opening of the case. On the one hand, the sealing performance of the sealing member on the end cover and the case is improved, and on the other hand, the integrity of the sealing member and the case is improved. In the process of assembling the battery cell, the sealing member may clad the end cover first, and then the end cover and sealing member may be installed on the case as a whole.

In some embodiments, the case is provided with a second position-limit portion at one end of the opening, and the second position-limit portion is used for limiting the end cover from leaving the case in the direction away from the electrode assembly. In a thickness direction of the end cover, at least part of the sealing member is located between the end cover and the second position-limit portion to realize a sealed connection between the end cover and the case.

In the above technical solution, the second position-limit portion limits the end cover from leaving the case in the direction away from the electrode assembly. At least a part of the sealing member is located between the end cover and the second position-limit portion to realize the sealed connection between the end cover and the case, thereby ensuring good sealing between the end cover and the case.

In some embodiments, the sealing member includes an enclosure and a second connecting portion, and the second connecting portion is connected to the enclosure. At least a part of the end cover is located in the enclosure. In the thickness direction of the end cover, the second connecting portion is located between the end cover and the second position-limit portion to achieve the sealed connection between the end cover and the case.

In the above technical solution, the sealing member includes the enclosure and the second connecting portion that are connected to each other. At least a part of the end cover is located in the enclosure, and the second connecting portion is located between the end cover and the second position-limit portion. The sealing member has a simple structure, which makes the sealing member and the end cover have a good integrity while achieving good sealing between the end cover and the case.

In a second aspect, a battery is provided in an embodiment of the present application, and includes the battery cell according to any one of the embodiments of the first aspect.

In a third aspect, an electrical device is provided in an embodiment of the present application, and includes the battery cell according to any one of the embodiments of the first aspect.

In a fourth aspect, a manufacturing method for a battery cell is provided in an embodiment of the present application, and includes: providing a case, the case having an opening; providing an electrode assembly; providing an end cover; providing a current collecting member; connecting the current collecting member to the electrode assembly; accommodating the electrode assembly and the current collecting member in the case; covering the opening with the end cover, and sealing and connecting the end cover to the case, so that the current collecting member is located at a side of the electrode assembly facing the end cover; wherein the case and the electrode assembly are electrically connected through the current collecting member.

In some embodiments, before the end cover covers the opening, the manufacturing method further includes welding the current collecting member to the case from an interior of the case.

In a fifth aspect, a manufacturing device for a battery cell is further provided in an embodiment of the present application, which includes: a first providing device configured to provide a case, the case having an opening; a second providing device configured to provide an electrode assembly; a third providing device configured to provide an end cover; a fourth providing device configured to provide a current collecting member; an assembling apparatus configured to connect the current collecting member to the electrode assembly, further configured to accommodate the electrode assembly and the current collecting member in the case; and further configured to cover the opening with the end cover, and seal and connect the end cover to the case, so that the current collecting member is located at a side of the electrode assembly facing the end cover; wherein the case and the electrode assembly are electrically connected through the current collecting member.

DESCRIPTION OF DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

7

Figure 1:
Figure 1:
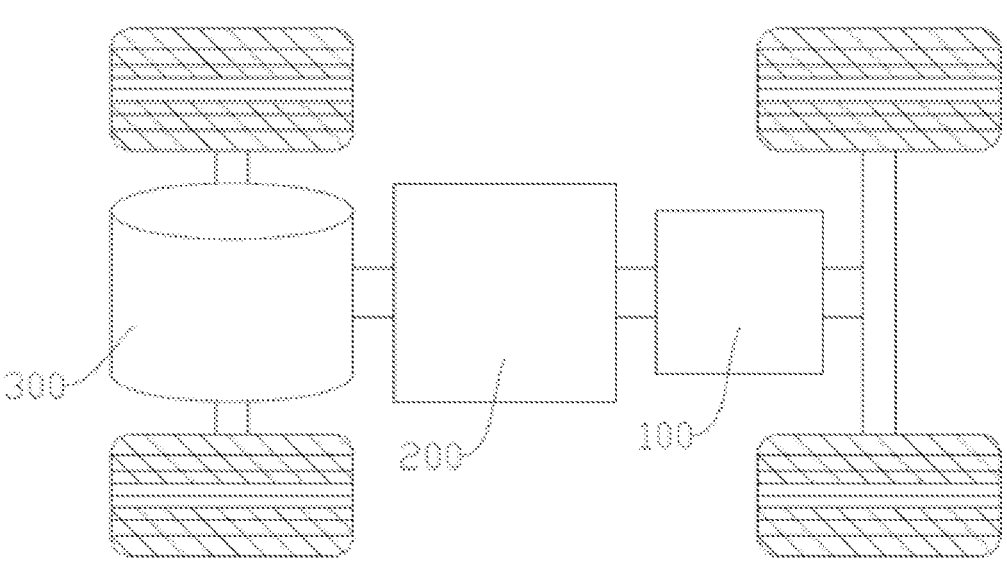
Figure 2:
Figure 2:
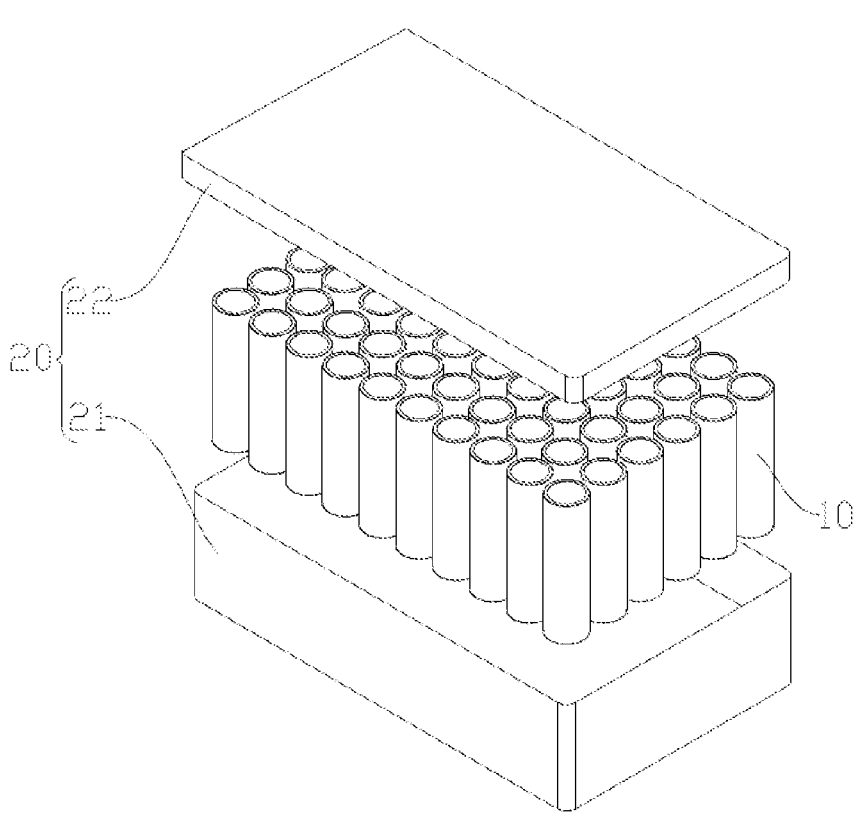
Figure 3:
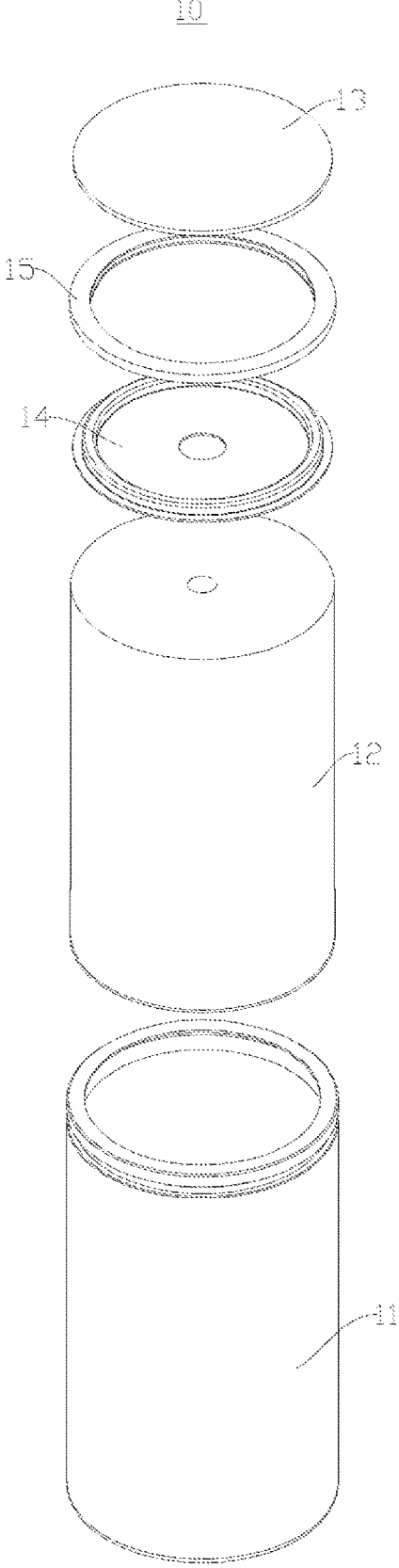
Figure 4:
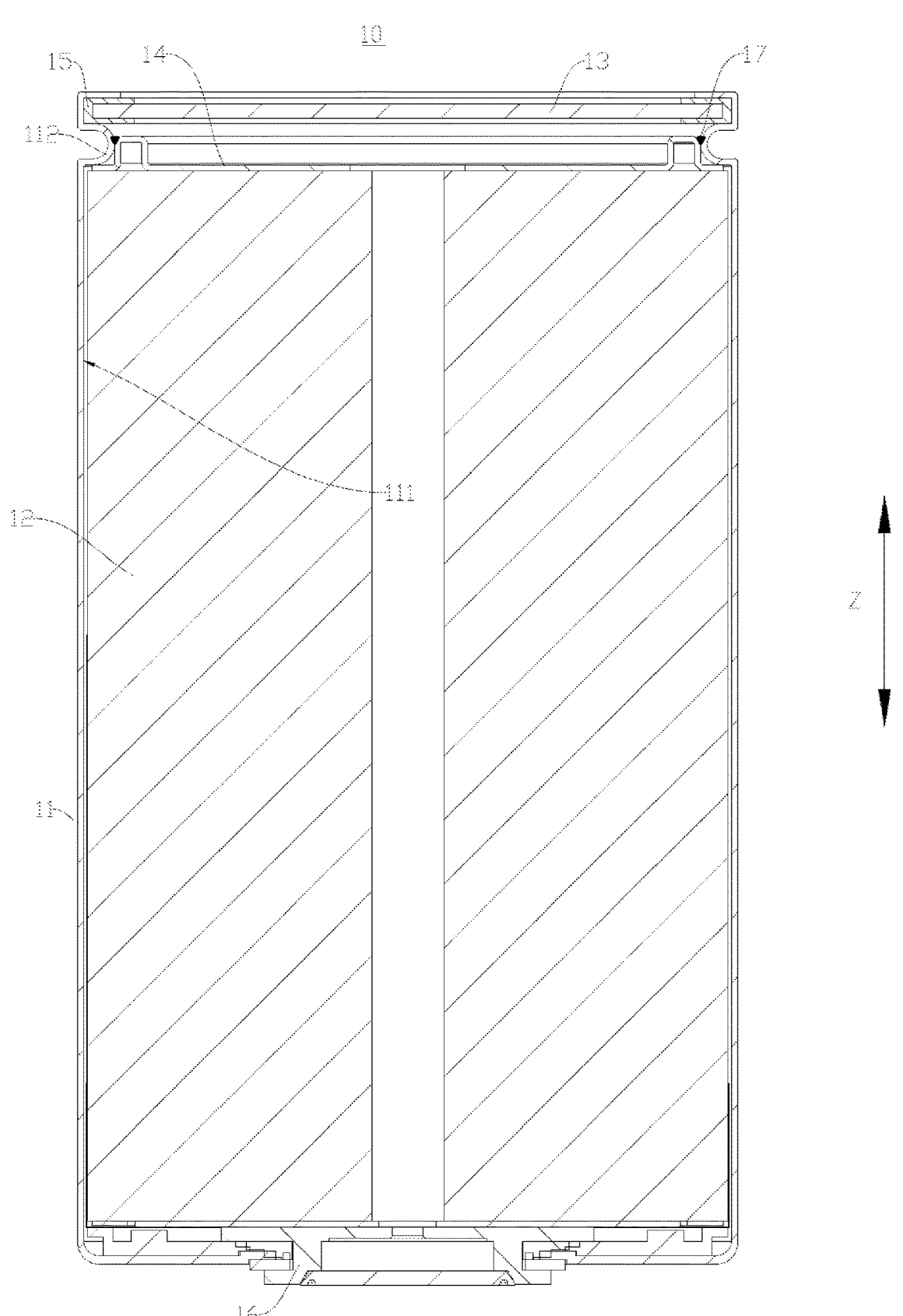
Figure 5:
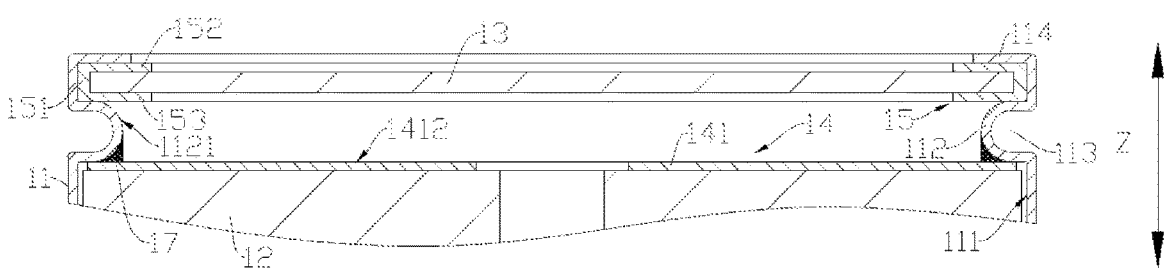
Figure 6:
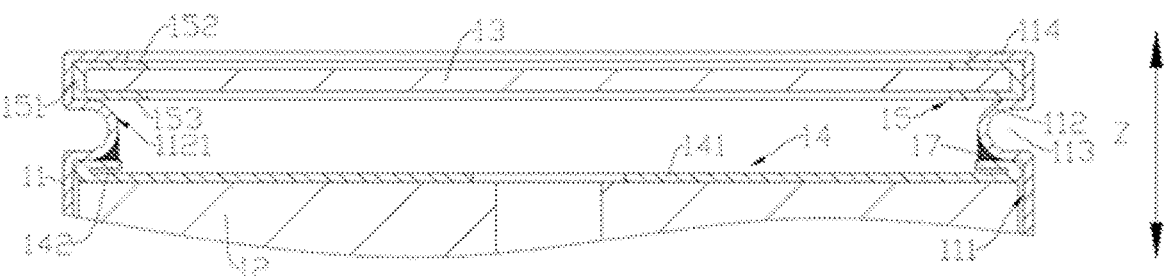
Figure 7:
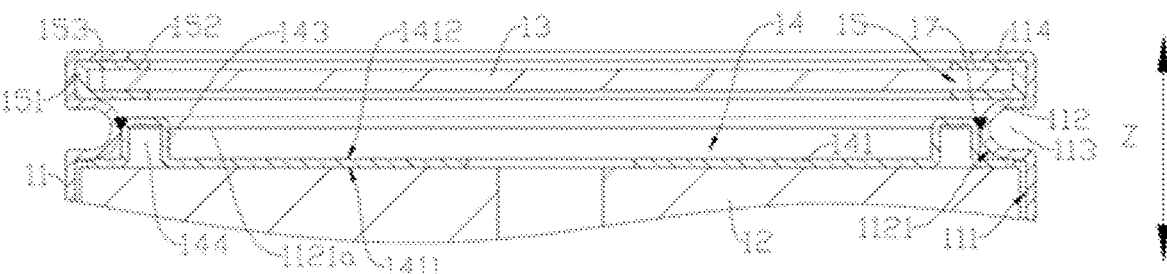
Figure 8:
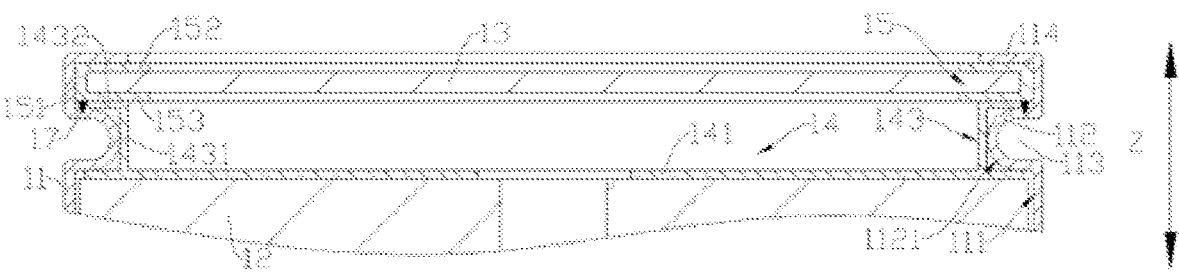
Figure 9:
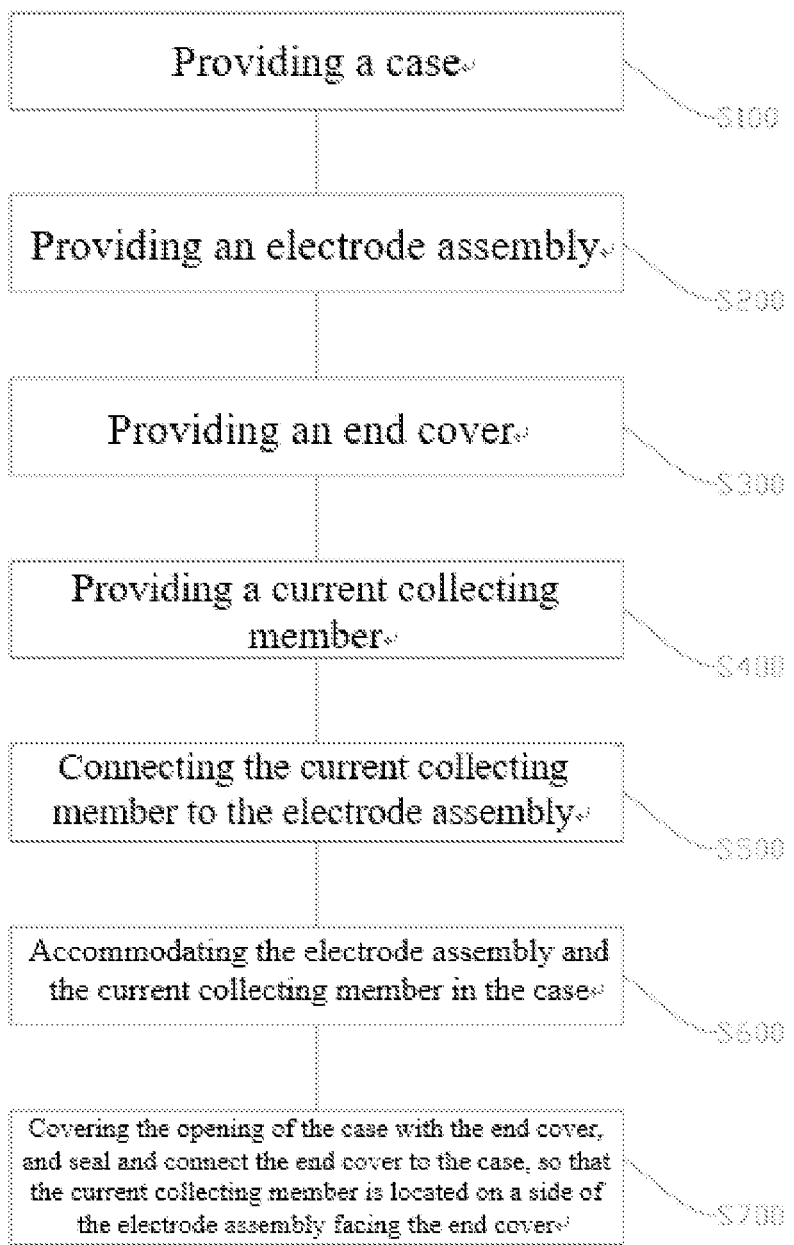
Figure 10:
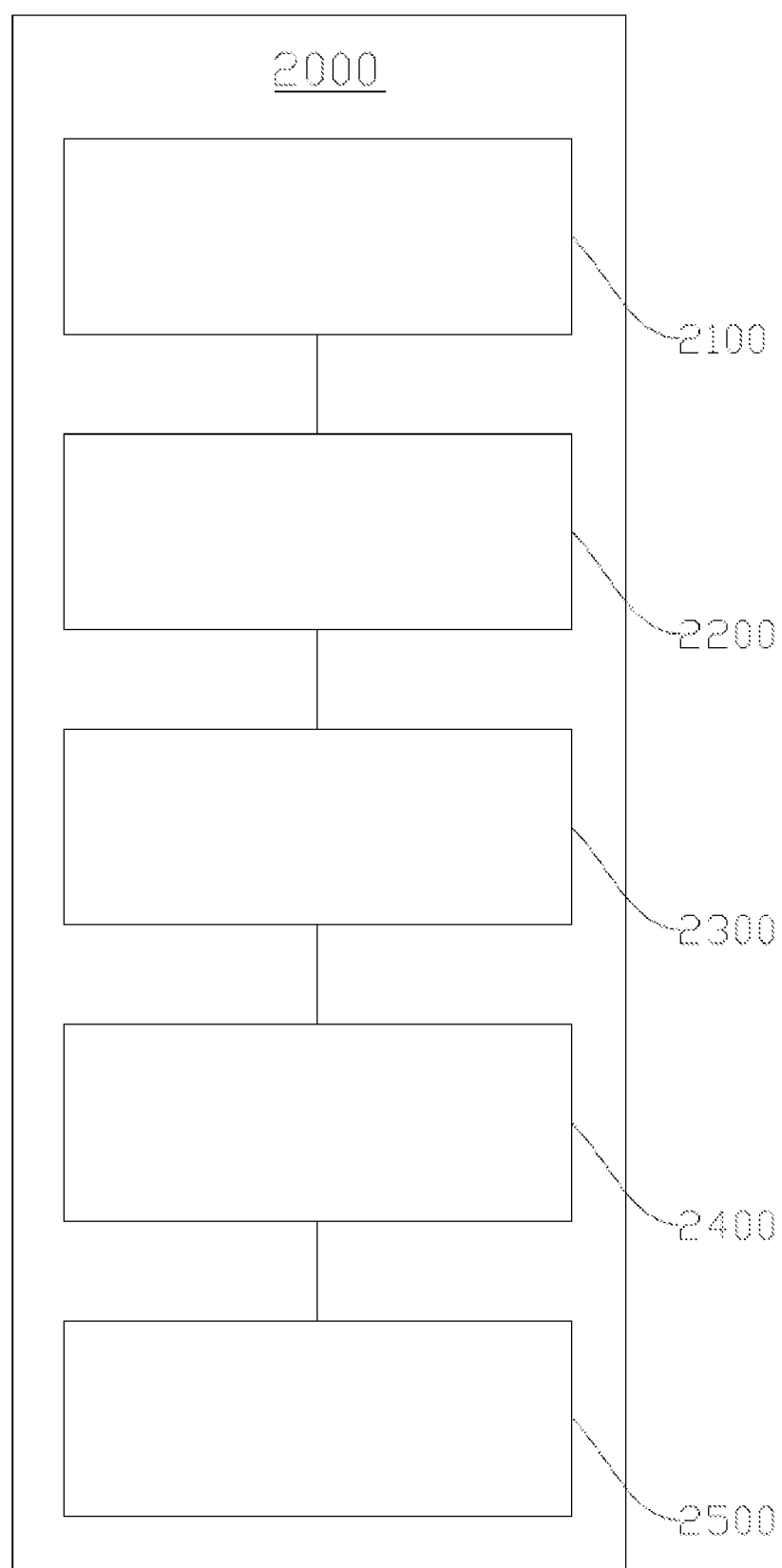

FIG. 1 is a schematic structural diagram of a vehicle according to some embodiments of the present application;

FIG. 2 is a schematic structural diagram of a battery according to some embodiments of the present application;

FIG. 3 is an exploded diagram of a battery cell according to some embodiments of the present application;

FIG. 4 is a sectional diagram of the battery cell shown in FIG. 3;

FIG. 5 is a partial diagram of a battery cell according to some embodiments of the present application;

FIG. 6 is a partial diagram of a battery cell according to some other embodiments of the present application;

FIG. 7 is a partial diagram of the battery cell shown in FIG. 4;

FIG. 8 is a partial diagram of a battery cell according to yet other embodiments of the present application;

FIG. 9 is a flowchart of a manufacturing method for a battery cell according to some embodiments of the present application; and FIG. 10 is a schematic structural diagram of a manufacturing device for a battery cell according to some embodiments of the present application.

Reference numerals: 10—Battery cell; 11 Case; 111—Inner side surface; 112—first position-limit portion; 1121—Inner peripheral surface; 1121*a*—Boundary position; 113—Roll groove; 114—Second position-limit portion; 12—Electrode assembly; 13—End cover; 14—Current collecting member; 141—Body part; 1411—Inner surface; 1412—Outer surface; 142—Elastic portion; 143—First connecting portion; 1431—extension section; 1432—Position-limit section; 144—Concave portion; 15—Sealing member; 151—Enclosure; 152—Second connecting portion; 153—Third connecting portion; 16—Electrode terminal; 17—Welded portion; 20—Box body; 21—First part; 22—Second part; 100—Battery; 200—Controller; 300—Motor; 1000—Vehicle; 2000—Manufacturing device; 2100—First providing device; 2200—Second providing device; 2300—Third providing device; 2400—Fourth providing device; 2500—Assembling apparatus; Z—Thickness direction.

DETAILED DESCRIPTION

To make the objective, technical solutions and advantages of the embodiments of the present application clearer, the technical solutions in the embodiments of the present application will be clearly described below with reference to the drawings in the embodiments of the present application. Obviously, the embodiments described are some of rather than all of the embodiments of the present application. Based on the examples in the present application, all other examples obtained by those of ordinary skill in the art without creative effort fall within the protection scope of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the drawings intended to cover non-exclusive inclusions. The terms "first," "second," and the like in Description and Claims of the present application or the above accompanying drawings are used for distinguishing different objects, rather than describing a specific order or primary and secondary relationship.

Reference to "an embodiment" in the present application means that a particular feature, structure, or characteristic described in connection with the embodiment may be included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that the terms "mounting," "connecting," "connection," and "attachment" should be understood in a broad sense, unless otherwise explicitly specified or defined. For example, it may be a fixed connection, a detachable connection, or an integrated connection; and it may be a direct connection or an indirect connection through an intermediate medium, or may be a communication between the interior of two elements. For those of ordinary skill in the art, the specific meanings of the above terms in the present application may be understood according to specific situations.

In the embodiments of the present application, identical reference numerals denote identical components, and for the sake of brevity, detailed descriptions of the same components are omitted in different embodiments. It should be understood that the thickness, length, width, and other dimensions of various components in the embodiments of the present application shown in the accompanying drawings, as well as the overall thickness, length, width, and other dimensions of the integrated device are only exemplary descriptions, and should not constitute any limitation to the present application.

The appearance of "a plurality of" in the present application refers to two or more (including two).

In the present application, the battery cell may include a lithium-ion secondary battery, a lithium-ion primary battery, a lithium-sulfur battery, a sodium-lithium-ion battery, a sodium-ion battery, a magnesium-ion battery, or the like, without limitation in the examples of the present application. The battery cell may be cylindrical, flat, rectangular, or in other shapes, which is also not limited in the embodiments of the present application. The battery cells are generally classified into three types according to encapsulating manners: cylindrical battery cells, rectangular battery cells, and pouch cells, which are not limited in the examples of the present application.

The battery mentioned in the embodiments of the present application refers to a single physical module including one or more battery cells to provide a higher voltage and capacity. For example, the battery mentioned in the present application may include a battery module, a battery pack, or the like. The battery generally includes a box body for encapsulating one or a plurality of battery cells. The box body is capable of preventing liquids or other foreign matters from affecting the charging or discharging of the battery cells.

The battery cell includes an electrode assembly and an electrolyte solution, the electrode assembly being composed of a positive electrode sheet, a negative electrode sheet, and a separator. The battery cell works mainly relying on the movement of metal ions between the positive electrode sheet and the negative electrode sheet. The positive electrode sheet includes a positive electrode current collector and a positive electrode active material layer, wherein the positive electrode active material layer is coated on a surface of the positive electrode current collector, the part of the positive electrode current collector not coated with the positive electrode active material layer protrudes from the part of the positive electrode current collector already coated with the positive electrode active material layer, and the part of the positive electrode current collector not coated with the positive electrode active material layer serves as a positive tab. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode sheet includes a negative electrode current collector and a negative electrode active material layer, wherein the negative electrode active material layer is coated on a surface of the negative electrode current collector, the part of the negative electrode current collector not coated with the negative electrode active material layer protrudes from the part of the negative electrode current collector already coated with the negative electrode active material layer, and the part of the negative electrode current collector not coated with the negative electrode active material layer serves as a negative tab. The material of the negative electrode current collector may be copper, and the negative electrode active material may be carbon, silicon, or the like. In order to ensure that no fusing occurs when a large current passes, there are a plurality of positive tabs which are laminated together, and there are a plurality of negative tabs which are laminated together. A material of the separator may be polypropylene (PP), polyethylene (PE), or the like. In addition, the electrode assembly may be of a wound structure or a laminated structure, which is not limited in the embodiments of the present application.

For a general battery cell, an electrode assembly needs to be electrically connected to a case so that the case may be used as a positive output electrode or negative output electrode of the battery cell. At present, it is inconvenient to realize an electrical connection between the electrode assembly and the case.

The inventor found that in a battery cell, as the case is a hollow structure having an opening at the top, the electrode assembly is electrically connected to the case. Generally, a bottom wall of the case is welded to the electrode assembly from the outside of the case to realize the electrical connection between the electrode assembly and the case. The electrode assembly is located in an interior of the case, and therefore, it is impossible to judge a welding condition between the electrode assembly and the bottom wall of the case, and it is inconvenient to realize the electrical connection between the electrode assembly and the case.

In view of this, a battery cell is provided in an embodiment of the present application. By arranging a current collecting member on a side of the electrode assembly facing an end cover, the electrode assembly is electrically connected to the case through the current collecting member, the end cover covers the opening of the case, and the end cover is sealed and connected to the case.

In such a battery cell, the electrical connection between the electrode assembly and the case is realized through the current collecting member. During assembling of the battery cell, the current collecting member may be connected to the case from the interior of the case. After the current collecting member is connected to the electrode assembly and the case, the end cover covers the opening of the case and is sealed and connected to the case, so that the electrical connection between the electrode assembly and the case is more convenient.

The battery cell described in the embodiment of the present application is applicable to a battery and an electrical device using the battery.

The electrical device may be, but not limited to, a vehicle, a mobile phone, a portable device, a laptop computer, a ship, a spacecraft, an electric toy, an electric tool, and the like. The vehicle may be a fuel vehicle, a gas vehicle or a new energy vehicle. The new energy vehicle may be an all-electric vehicle, a hybrid vehicle, an extended range electric vehicle, or the like. The spacecraft includes an airplane, a rocket, a space shuttle, a spaceship, and the like. The electric toy includes a fixed or mobile electric toy, such as a game console, an electric car toy, an electric ship toy, and an electric aircraft toy. The electric tool includes a metal cutting electric tool, a grinding electric tool, an assembly electric tool, and a railway electric tool, such as an electric drill, an electric grinder, an electric wrench, an electric screwdriver, an electric hammer, an impact drill, a concrete vibrator, and an electric planer. The embodiments of the present application do not impose special limitations on the above electrical device.

For convenience of explanation, the following embodiments are described by taking an electrical device being a vehicle as an example.

Referring to FIG. 1, FIG. 1 is a schematic structural diagram of vehicle 1000 according to some embodiments of the present application. The interior of vehicle 1000 is provided with battery 100, and battery 100 may be provided at the bottom or head or tail of vehicle 1000. Battery 100 may be configured to power vehicle 1000, for example, battery 100 may serve as an operating power source for vehicle 1000.

Vehicle 1000 may further include controller 200 and motor 300, wherein controller 200 is configured to control battery 100 to power motor 300, for example, for the operating power demand when vehicle 1000 is starting, navigating, and driving.

In some embodiments of the present application, battery 100 not only may serve as an operating power source of vehicle 1000, but also may serve as a driving power source of vehicle 1000, thus replacing or partially replacing fuel or natural gas to provide driving power for vehicle 1000.

In some embodiments, referring to FIG. 2, FIG. 2 is a schematic structural diagram of battery 100 according to some embodiments of the present application. Battery 100 includes a plurality of battery cells 10. The plurality of battery cells 10 may be connected in series or in parallel or in a parallel-series connection. The parallel-series connection means that the plurality of battery cells 10 are connected both in series and parallel.

In some embodiments, battery 100 may further include a converging portion, and the plurality of battery cells 10 may be electrically connected through the converging portion, so as to realize series, parallel or parallel-series connection of the plurality of battery cells 10.

The converging portion may be a metal conductor such as copper, iron, aluminum, stainless steel, and aluminum alloy.

In some embodiments, battery cell 10 may further include box body 20, and box body 20 is used for accommodating battery cell 10. Box body 20 may include first part 21 and second part 22, and first part 21 and second part 22 mutually cover to define an accommodating space for accommodating battery cell 10. Of course, the connection between first part 21 and second part 22 may be sealed by a sealing member, and the sealing member may be a sealing ring, a sealant, or the like.

First part 21 and second part 22 may have various shapes, such as a rectangular parallelepiped and a cylinder. First part 21 may be a hollow structure with one side open, and second part 22 may also be a hollow structure with one side open. The open side of second part 22 covers the open side of first part 21 to form box body 20 having an accommodating space. Of course, it may also be possible that first part 21 is a hollow structure with one side open, second part 22 is a plate-like structure, and second part 22 covers the open side of first part 21 to form box body 20 with an accommodating space.

Referring to FIG. 3, FIG. 3 is an exploded diagram of battery cell 10 according to some embodiments of the present application. Battery cell 10 may include case 11, electrode assembly 12, end cover 13, current collecting member 14, and sealing member 15.

Case 11 is a component for accommodating electrode assembly 12, case 11 may be a hollow structure with an opening formed at one end, and case 11 may also be a hollow structure with openings formed at both ends. Case 11 may be made of various materials, such as copper, iron, aluminum, stainless steel, and aluminum alloy. Case 11 may be of a variety of shapes, such as a cylinder and a rectangular parallelepiped. For example, in FIG. 3, case 11 is a cylinder, and battery cell 10 shown in FIG. 3 is cylindrical battery 100.

Electrode assembly 12 is a component in which an electrochemical reaction occurs in battery cell 10. Electrode assembly 12 may include a main body part and tabs, and the tabs extend from the main body part such that the tabs protrude beyond ends of the main body part. The main body part may include a positive electrode sheet, a negative electrode sheet, and a separator. The main body part may be a wound structure formed by winding the positive electrode sheet, the separator, and the negative electrode sheet. The main body part may also be a laminated structure formed by a laminating arrangement of the positive electrode sheet, the separator, and the negative electrode sheet.

The positive electrode sheet includes a positive electrode current collector and a positive electrode active material layer coated on opposite sides of the positive electrode current collector. The negative electrode sheet includes a negative electrode current collector and a negative electrode active material layer coated on opposite sides of the negative electrode current collector. The main body part is a part of electrode assembly 12 corresponding to a region where the electrode sheet is coated with the active material layer, and the tab is a part where the electrode sheet is not coated with the active material layer. The tabs may be classified into a positive tab and a negative tab. The positive tab and the negative tab protrude from both ends of the main body part respectively.

End cover 13 is a component that covers the opening of case 11 to isolate an internal environment of battery cell 10 from an external environment. End cover 13 covers the opening of case 11, and end cover 13 and case 11 together define a sealed space for accommodating electrode assembly 12, the electrolyte solution, and current collecting member 14. The shape of end cover 13 may be adapted to the shape of case 11. For example, case 11 is a rectangular parallelepiped structure, and end cover 13 is a rectangular plate-shaped structure that matches case 11. For another example, case 11 is a cylindrical structure, and end cover 13 is a circular plate-shaped structure that matches case 11. The material of end cover 13 may also be various, and end cover 13 may be a metal material such as copper, iron, aluminum, steel, and aluminum alloy. The material of end cover 13 and the material of case 11 may be the same or different.

In battery cell 10, one or two end covers 13 may be provided. If case 11 is a hollow structure having an opening formed at one end, one end cover 13 is correspondingly arranged. If case 11 is a hollow structure with openings formed at both ends, two end covers 13 are correspondingly arranged. Two end covers 13 respectively cover the two openings of case 11. One of the positive tab and the negative tab of electrode assembly 12 is electrically connected to one end cover 13, and the other is electrically connected to case 11. In the embodiment that case 11 is a hollow structure having an opening at one end, electrode terminal 16 (not shown in FIG. 3) may be arranged at the end of case 11 away from end cover 13. Electrode terminal 16 is insulated with case 11. One of the positive tab and the negative tab of electrode assembly 12 is electrically connected to case 11, and the other is electrically connected to electrode terminal 16.

Current collecting member 14 is a component connecting case 11 and electrode assembly 12 to realize the electrical connection between electrode assembly 12 and case 11, so that case 11 acts as an output electrode of battery cell 10. In the embodiment of the electrical connection between electrode assembly 12 and electrode terminal 16, the positive tab or the negative tab of electrode assembly 12 may also be electrically connected to electrode terminal 16 through current collecting member 14. For example, the negative tab of electrode assembly 12 is electrically connected to case 11 through current collecting member 14, and the positive tab of electrode assembly 12 is electrically connected to electrode terminal 16 through another current collecting member 14.

Current collecting member 14 may be a metal conductor such as copper, iron, aluminum, stainless steel, and aluminum alloy.

Sealing member 15 is a component arranged between end cover 13 and case 11 to realize the sealed connection between end cover 13 and case 11. The material of sealing member 15 may be various, such as rubber and plastic.

Referring to FIG. 4, FIG. 4 is a sectional diagram of battery cell 10 shown in FIG. 3. The embodiment of the present application provides battery cell 10, and battery cell 10 includes case 11, electrode assembly 12, end cover 13, and current collecting member 14. Case 11 has an opening. Electrode assembly 12 is accommodated in case 11. End cover 13 covers the opening and is sealed and connected to case 11. Current collecting member 14 is accommodated in case 11 and is located on the side of electrode assembly 12 facing end cover 13. Current collecting member 14 is configured to connect case 11 and electrode assembly 12 so that electrode assembly 12 is electrically connected to case 11.

Current collecting member 14 is a component that realizes the electrical connection between electrode assembly 12 and case 11. Current collecting member 14 is connected to both electrode assembly 12 and case 11. The connection between current collecting member 14 and electrode assembly 12 may be that current collecting member 14 is connected to the positive tab of electrode assembly 12, or connected to the negative tab of electrode assembly 12. The connection between current collecting member 14 and electrode assembly 12 may be that both of them are connected and fixed together. For example, current collecting member 14 is welded to the positive tab or the negative tab of electrode assembly 12, or they may just abut against each other. For example, current collecting member 14 and the positive tab or the negative tab of electrode assembly 12 just abut against each other. The connection between current collecting member 14 and case 11 may be that they are connected and fixed together. For example, current collecting member 14 is welded to case 11, or they may just abut against each other.

In the embodiment of the present application, current collecting member 14 is located on the side of electrode assembly 12 facing end cover 13, electrode assembly 12 is electrically connected to case 11 through current collecting member 14, end cover 13 covers the opening of case 11, and end cover 13 is sealed and connected to case 11. Battery cell 10 of this structure realizes the electrical connection between electrode assembly 12 and case 11 through current collecting member 14, and current collecting member 14 may be connected to case 11 from the interior of case 11. After current collecting member 14 is connected to electrode assembly 12 and case 11, end cover 13 covers the opening of case 11 and is sealed and connected to case 11, so that the electrical connection between electrode assembly 12 and case 11 is more convenient.

For common battery cell 10, since the bottom wall of case 11 is welded to the tab, it is easy to break down the bottom wall of case 11 during the welding of the bottom wall of case 11 to the tab, resulting in liquid leakage and affecting the performance of battery cell 10. In the embodiment of the present application, electrode assembly 12 is electrically connected to case 11 through current collecting member 14, end cover 13 is sealed and connected to case 11, electrode assembly 12 is not directly connected to end cover 13, and battery cell 10 is less likely to have leakage from the side of end cover 13.

As an example, current collecting member 14 connects case 11 and the negative tab of electrode assembly 12, so that case 11 is used as the negative output electrode of battery cell 10. Electrode terminal 16 at the end of case 11 away from end cover 13 is electrically connected to the positive tab of electrode assembly 12, so that electrode terminal 16 is used as the positive output electrode of battery cell 10.

In some embodiments, current collecting member 14 is welded to case 11. The connection mode between current collecting member 14 and case 11 is simple, which is capable of ensuring the firmness of the connection between current collecting member 14 and case 11, and realize the stable overcurrent between current collecting member 14 and case 11.

When current collecting member 14 is welded to case 11, it may be welded on the outside of case 11. For example, current collecting member 14 and case 11 are welded together from the outside of case 11 by penetration welding. Current collecting member 14 may also be welded to case 11 from the interior of case 11. When the welding is performed on the outside of case 11, and welded portion 17 formed after current collecting member 14 is welded to case 11 is located on the outside of case 11. When the welding is performed from the interior of case 11, welded portion 17 formed after current collecting member 14 is welded to case 11 is located inside case 11.

In some embodiments, current collecting member 14 is welded to case 11 to form welded portion 17, welded portion 17 is used for fixing current collecting member 14 and case 11, and welded portion 17 is located inside case 11.

Welded portion 17 plays the role of fixing current collecting member 14 and case 11, that is, current collecting member 14 is fixed to case 11 through welded portion 17. Welded portion 17 may be a solder connected between current collecting member 14 and case 11, or a fusion portion fused between current collecting member 14 and case 11.

Taking case 11 made of steel as an example, if welded portion 17 formed by welding current collecting member 14 and case 11 is located outside case 11, an outer protective layer of case 11 is easy to be damaged and corroded during the welding of current collecting member 14 and case 11.

In the present embodiment, welded portion 17 formed by the welding of current collecting member 14 and case 11 is located inside case 11, which reduces the risk of damage to the outer layer structure of case 11 due to welded portion 17 being located outside case 11 during the welding of current collecting member 14 and case 11, thereby reducing the risk of corrosion of case 11, and improving the service life of battery cell 10.

In some embodiments, still referring to FIG. 4, first position-limit portion 112 is protruded on inner side surface 111 of case 11, and first position-limit portion 112 is used for limiting end cover 13 from moving in a direction facing electrode assembly 12. Current collecting member 14 is welded to first position-limit portion 112.

Inner side surface 111 of case 11 refers to an inner side surface of a side wall of case 11 extending in thickness direction Z of end cover 13. First position-limit portion 112 is a structure protruding on inner side surface 111 of case 11 and limiting end cover 13 from moving in the direction facing electrode assembly 12. First position-limit portion 112 and case 11 may be an integrally molded structure, or may be connected together after split forming.

In the present embodiment, first position-limit portion 112 plays a position limiting role on end cover 13, and first position-limit portion 112 is capable of limiting end cover 13 from moving in the direction facing electrode assembly 12. Current collecting member 14 is welded to first position-limit portion 112 which plays a position limiting role on end cover 13, and first position-limit portion 112 is effectively used to facilitate the welding and fixation of current collecting member 14.

In some embodiments, referring to FIG. 5, FIG. 5 is a partial diagram of battery cell 10 according to some embodiments of the present application. Current collecting member 14 includes body part 141 for connecting to electrode assembly 12. Body part 141 is located on the side of first position-limit portion 112 facing electrode assembly 12. First position-limit portion 112 is used for limiting body part 141 from leaving case 11 in the direction away from electrode assembly 12.

Body part 141 is a part connecting current collecting member 14 and electrode assembly 12. For example, body part 141 is welded to the negative tab of electrode assembly 12. Current collecting member 14 may be body part 141 as a whole, or a part of current collecting member 14 may be body part 141. For example, in FIG. 5, current collecting member 14 is body part 141 as a whole.

First position-limit portion 112 plays a position limiting role on body part 141. First position-limit portion 112 is capable of limiting body part 141 from leaving case 11 in the direction away from electrode assembly 12. First position-limit portion 112 is capable of separating end cover 13 and body part 141. Body part 141 is less likely to affect the sealing of end cover 13 and case 11, and ensures the sealing between end cover 13 and case 11.

In some embodiments, still referring to FIG. 5, body part 141 abuts against one side of first position-limit portion 112 facing electrode assembly 12 and is welded to first position-limit portion 112.

Body part 141 abuts against the side of first position-limit portion 112 facing electrode assembly 12. Understandably, body part 141 abuts against an end face of first position-limit portion 112 facing electrode assembly 12. First position-limit portion 112 functions to prevent body part 141 from moving in the direction away from electrode assembly 12.

In the present embodiment, body part 141 abuts against the side of first position-limit portion 112 facing electrode assembly 12 and is welded to first position-limit portion 112, so that the whole current collecting member 14 has good firmness after being fixed to first position-limit portion 112, and a contact area between current collecting member 14 and first position-limit portion 112 is increased, thereby increasing the overcurrent area between case 11 and current collecting member 14.

For example, in FIG. 5, body part 141 has outer surface 1412 away from electrode assembly 12 in thickness direction Z of end cover 13, first position-limit portion 112 has inner peripheral surface 1121, and welded portion 17 formed by welding body part 141 to first position-limit portion 112 is connected to outer surface 1412 of body part 141 and inner peripheral surface 1121 of first position-limit portion 112.

In some embodiments, referring to FIG. 6, FIG. 6 is a partial diagram of battery cell 10 according to other embodiments of the present application. Current collecting member 14 may further include elastic portion 142, elastic portion 142 is connected to body part 141, and elastic portion 142 abuts against first position-limit portion 112 and is welded to first position-limit portion 112.

Elastic portion 142 is a part of current collecting member 14 that is connected to body part 141 and is capable of generating elastic deformation. In thickness direction Z of end cover 13, elastic portion 142 is located on the side of body part 141 facing first position-limit portion 112. Elastic portion 142 and body part 141 may be an integrally molded structure, or a structure that is connected together after split forming. There may be one or a plurality of elastic portions 142 in current collecting member 14. If there are a plurality of elastic portions 142 in current collecting member 14, the plurality of elastic portions 142 may be distributed on body part 141 at intervals in a circumferential direction of body part 141.

In the present embodiment, elastic portion 142 of current collecting member 14 abuts against first position-limit portion 112 and is welded to first position-limit portion 112. Elastic portion 142 is capable of generating elastic deformation according to a change of a distance between body part 141 and first position-limit portion 112, thereby reducing the risk of a failure of the electrical connection between body part 141 and electrode assembly 12 as electrode assembly 12 moves due to vibration of battery cell 10 in case 11.

In some embodiments, still referring to FIG. 6, elastic portion 142 is a leaf spring bent and arranged on body part 141. Such elastic portion 142 has a simple structure and good deformation capacity, thereby ensuring that elastic portion 142 has a large contact area with first position-limit portion 112.

In another embodiment, elastic portion 142 may also be another structure, for example, elastic portion 142 is a spring structure connected to body part 141.

In some embodiments, referring to FIG. 7, FIG. 7 is a partial diagram of battery cell 10 shown in FIG. 4. Current collecting member 14 may further include first connecting portion 143, and first connecting portion 143 is connected to body part 141. First connecting portion 143 extends at least partially to an inner peripheral side of first position-limit portion 112, and first connecting portion 143 is welded to first position-limit portion 112.

First connecting portion 143 is a part welded between current collecting member 14 and first position-limit portion 112, and at least part of the part extends to the inner peripheral side of first position-limit portion 112. Taking first position-limit portion 112 having inner peripheral surface 1121 as an example, first connecting portion 143 extends at least partially to the inner peripheral side of first position-limit portion 112, that is, first connecting portion 143 extends at least partially to a space defined by inner peripheral surface 1121 of first position-limit portion 112.

In the present embodiment, first connecting portion 143 is welded to first position-limit portion 112. A part of first connecting portion 143 of current collecting member 14 extends to the inner peripheral side of first position-limit portion 112, and therefore, first connecting portion 143 and first position-limit portion 112 may be directly welded together, thereby reducing the difficulty in welding of current collecting member 14 and first position-limit portion 112.

It should be noted that, when first connecting portion 143 of current collecting member 14 is welded to first position-limit portion 112, body part 141 of current collecting member 14 may abut against the side of first position-limit portion 112 facing electrode assembly 12, or body part 141 may be arranged in a gap with first position-limit portion 112 in thickness direction Z of end cover 13. In FIG. 7, body part 141 abuts against the side of first position-limit portion 112 facing electrode assembly 12 to increase the overcurrent area between current collecting member 14 and case 11.

In some embodiments, still referring to FIG. 7, first connecting portion 143 is a convex portion extending from body part 141 in the direction away from electrode assembly 12, and the convex portion is used for forming a positioning fit with inner peripheral surface 1121 of first position-limit portion 112.

Convex portion forms the positioning fit with inner peripheral surface 1121 of first position-limit portion 112, and an outer peripheral surface of convex portion contacts inner peripheral surface 1121 of first position-limit portion 112 to prevent convex portion from shaking in a direction perpendicular to thickness direction Z of end cover 13.

In the present embodiment, first connecting portion 143 is the convex portion that forms a positioning fit with inner peripheral surface 1121 of first position-limit portion 112, the convex portion forms the positioning fit with inner peripheral surface 1121 of first position-limit portion 112, thereby reducing the risk of shaking of current collecting member 14 during the welding between first connecting portion 143 and first position-limit portion 112, reducing the difficulty in welding, and improving the firmness of first connecting portion 143 and first position-limit portion 112 after the welding. At the same time, the contact area between case 11 and current collecting member 14 is increased to increase the overcurrent area of case 11 and current collecting member 14.

In some embodiments, still referring to FIG. 7, body part 141 has inner surface 1411 facing electrode assembly 12 and outer surface 1412 away from electrode assembly 12. The convex portion extends from outer surface 1412 of body part 141 in the direction away from electrode assembly 12. Current collecting member 14 further includes concave portion 144, and concave portion 144 is recessed from inner surface 1411 of body part 141 to the convex portion in the direction away from electrode assembly 12.

The arrangement of concave portion 144 of current collecting member 14, on the one hand, reduces the material of current collecting member 14 and reduces the manufacturing cost, and on the other hand, improves the deformation ability of the convex portion, causes the convex portion to abut against first position-limit portion 112, and ensures that the convex portion is in good contact with first position-limit portion 112.

In some embodiments, both the convex portion and concave portion 144 are annular structures extending in a circumferential direction of first position-limit portion 112.

Both the convex portion and concave portion 144 are annular structures, so that the convex portion has a better deformation ability. If the convex portion is subjected to a radial force exerted by first position-limit portion 112, the convex portion is capable of shrinking and deforming toward a center position, so that the convex portion and first position-limit portion 112 form a close fit, and the convex portion and first position-limit portion 112 are in good contact.

In some embodiments, still referring to FIG. 7, in the direction that first connecting portion 143 extends from body part 141 in the direction away from electrode assembly 12, one end of first connecting portion 143 away from body part 141 does not exceed first position-limit portion 112.

The end of first connecting portion 143 away from body part 141 does not exceed first position-limit portion 112, that is, the end of first connecting portion 143 away from body part 141 is located in first position-limit portion 112. It is understandable that in thickness direction Z of end cover 13, an end face of first connecting portion 143 away from body part 141 is closer to electrode assembly 12 than an end face of first position-limit portion 112 away from electrode assembly 12.

In the present embodiment, the end of first connecting portion 143 away from body part 141 does not exceed first position-limit portion 112, and therefore, first connecting portion 143 is less likely to interfere with end cover 13, thereby ensuring the sealing between end cover 13 and case 11.

In some embodiments, still referring to FIG. 7, first connecting portion 143 is welded to inner peripheral surface 1121 of first position-limit portion 112. Inner peripheral surface 1121 of first position-limit portion 112 has boundary position 1121*a*. Radial dimensions of inner peripheral surface 1121 of first position-limit portion 112 gradually increase from boundary position 1121*a* to both ends of inner peripheral surface 1121 of first position-limit portion 112. In the direction that first connecting portion 143 extends from body part 141 in the direction away from electrode assembly 12, the end of first connecting portion 143 away from body part 141 exceeds boundary position 1121*a*.

In the above description, the two ends of inner peripheral surface 1121 refer to two ends of inner peripheral surface 1121 in thickness direction Z of end cover 13.

The radial dimensions of inner peripheral surface 1121 of first position-limit portion 112 gradually increase from boundary position 1121*a* to the two ends of inner peripheral surface 1121 of first position-limit portion 112, so that inner peripheral surface 1121 of first position-limit portion 112 is a necking structure with large ends and a small middle portion. For example, an intersection line between inner peripheral surface 1121 of first position-limit portion 112 and an axial section is a circular arc, and the axial section is parallel to thickness direction Z of end cover 13.

In the present embodiment, the end of first connecting portion 143 away from body part 141 exceeds boundary position 1121*a*, and therefore, a welded joint is formed between the outer peripheral surface of first connecting portion 143 and inner peripheral surface 1121 of first position-limit portion 112 to facilitate the welding and fixation of first connecting portion 143 and first position-limit portion 112.

For example, in FIG. 7, welded portion 17 formed by welding first connecting portion 143 to first position-limit portion 112 is located in the welded joint formed between first connecting portion 143 and first position-limit portion 112.

In some embodiments, referring to FIG. 8, FIG. 8 is a partial diagram of battery cell 10 according to some embodiments of the present application. First connecting portion 143 may include extension section 1431 and position-limit section 1432. extension section 1431 is connected to body part 141. extension section 1431 extends from body part 141 in the direction away from electrode assembly 12. extension section 1431 extends at least partially to the inner peripheral side of first position-limit portion 112. Position-limit section 1432 is connected to extension section 1431, and position-limit section 1432 abuts against one side of first position-limit portion 112 away from electrode assembly 12 and is welded to first position-limit portion 112.

extension section 1431 is a part of first connecting portion 143 extending to the interior of first position-limit portion 112, and position-limit section 1432 is a part of first connecting portion 143 welded to first position-limit portion 112. extension section 1431 extends at least partially to the inner peripheral side of first position-limit portion 112, and position-limit section 1432 abuts against the side of first position-limit portion 112 away from electrode assembly 12, so that first connecting portion 143 is hung on first position-limit portion 112, and therefore, body part 141 of current collecting member 14 closely abuts against first position-limit portion 112. For example, extension section 1431 is a cylindrical structure, and position-limit section 1432 is an annular structure arranged at one end of extension section 1431 away from body part 141. Position-limit section 1432 may be welded to first position-limit portion 112 by penetration welding.

In the present embodiment, position-limit section 1432 abuts against the side of first position-limit portion 112 away from electrode assembly 12 and is welded to first position-limit portion 112. Position-limit section 1432 plays a position limiting role, improves the firmness of current collecting member 14 and first position-limit portion 112 after the welding, increases the contact area between current collecting member 14 and first position-limit portion 112, and increases the overcurrent area between case 11 and current collecting member 14.

In some embodiments, still referring to FIG. 5 to FIG. 8, first position-limit portion 112 is an annular structure extending in the circumferential direction of case 11. First position-limit portion 112 of such structure is easy to form and manufacture. First position-limit portion 112 is capable of limiting end cover 13 at the whole circumference, thereby ensuring the limiting ability of first position-limit portion 112 to end cover 13.

In some embodiments, roll groove 113 is arranged at a position corresponding to first position-limit portion 112 on the outer side surface of case 11.

In the process of forming roll groove 113, case 11 will form first position-limit portion 112 at the position corresponding to roll groove 113, which is capable of simplifying the forming process of first position-limit portion 112. After first position-limit portion 112 is formed by the process of roll groove 113, a radial dimension of inner peripheral surface 1121 of first position-limit portion 112 gradually increases from boundary position 1121a to both ends of inner peripheral surface 1121 of first position-limit portion 112.

In the embodiment where first position-limit portion 112 is an annular structure extending in the circumferential direction of case 11, roll groove 113 may also be an annular structure extending in an axial direction of case 11.

In some embodiments, battery cell 10 further includes sealing member 15, and end cover 13 and case 11 are sealed and connected through sealing member 15 to ensure the sealing performance of end cover 13 and case 11.

Sealing member 15 may be made of rubber, plastic, or other materials.

In some embodiments, sealing member 15 is configured to insulate and isolate case 11 from end cover 13. Sealing member 15 not only plays a sealing role but also an insulating role between case 11 and end cover 13, which reduces the risk of electrification of end cover 13 while ensuring the sealing performance of end cover 13 and case 11.

In some embodiments, sealing member 15 is configured to clad end cover 13 in the circumferential direction of the opening of case 11. On the one hand, such structure improves the sealing performance of sealing member 15 on end cover 13 and case 11, and on the other hand, improves the integrity of sealing member 15 and case 11. In the process of assembling battery cell 10, sealing member 15 may first clad end cover 13, and then end cover 13 and sealing member 15 may be installed on case 11 as a whole.

In some embodiments, case 11 is provided with second position-limit portion 114 at one end of the opening, and second position-limit portion 114 is used for limiting end cover 13 from leaving case 11 in the direction away from electrode assembly 12. In thickness direction Z of end cover 13, at least part of sealing member 15 is located between end cover 13 and second position-limit portion 114 to realize the sealed connection between end cover 13 and case 11.

Second position-limit portion 114 plays a limiting role on end cover 13 to limit end cover 13 from leaving case 11 in the direction away from electrode assembly 12. Second position-limit portion 114 and first position-limit portion 112 are capable of cooperating to limit end cover 13 from moving in thickness direction Z of end cover 13, so as to limit end cover 13 to an end of case 11 having the opening. At least part of sealing member 15 is located between end cover 13 and second position-limit portion 114; therefore, the sealed connection between end cover 13 and case 11 is realized, and a good sealing between end cover 13 and case 11 is ensured.

For example, second position-limit portion 114 may be a flange structure in which case 11 is partially folded inward, and second position-limit portion 114 may be formed at the opening of case 11 by folding case 11. In the process of assembling battery cell 10, electrode assembly 12 and current collecting member 14 may be accommodated in case 11 first, and then case 11 is processed by roll groove 113 to form first position-limit portion 112. Then, end cover 13 and sealing member 15 abut against first position-limit portion 112 as a whole, and finally second position-limit portion 114 is formed by folding case 11 to limit end cover 13.

In some embodiments, sealing member 15 includes enclosure 151 and second connecting portion 152, and second connecting portion 152 is connected to enclosure 151. At least a part of end cover 13 is located in enclosure 151. In thickness direction Z of end cover 13, second connecting portion 152 is located between end cover 13 and second position-limit portion 114 to realize the sealed connection between end cover 13 and case 11.

Enclosure 151 is arranged around an outer circumference of end cover 13 to realize that sealing member 15 clads end cover 13 in the circumferential direction of the opening of case 11. For example, end cover 13 presses enclosure 151 against inner side surface 111 of case 11, and enclosure 151 and second position-limit portion 114 both play a sealing role.

In the present embodiment, at least a part of end cover 13 is located in enclosure 151, and second connecting portion 152 is located between end cover 13 and the second position-limit portion; therefore, sealing member 15 has a simple structure, so that sealing member 15 and end cover 13 have a good integrity while achieving a good sealing between end cover 13 and case 11.

In some embodiments, sealing member 15 may further include third connecting portion 153, third connecting portion 153 is connected to enclosure 151, third connecting portion 153 abuts against first position-limit portion 112, and third connecting portion 153 and second connecting portion 152 respectively abut against two ends of end cover 13 in thickness direction Z of end cover 13, so that sealing member 15 cannot move relative to end cover 13 in thickness direction Z of end cover 13, and therefore, sealing member 15 and end cover 13 have good integrity.

For example, both first connecting portion 143 and second connecting portion 152 are annular structures.

In addition, battery 100 including a plurality of battery cells 10 according to any one of the above embodiments is provided in an embodiment of the present application.

An electrical device is provided in an embodiment of the present application, and includes battery cell 10 according to any of the above embodiments.

The electrical device may be any of the above devices using battery 100.

In addition, referring to FIG. 4 and FIG. 7, battery cell 10 is further provided in an embodiment of the present application, including case 11, electrode assembly 12, end cover 13, and current collecting member 14. Case 11 has an opening, an outer side surface of case 11 is provided with roll groove 113, and first position-limit portion 112 protruding from inner side surface 111 of case 11 is formed on case 11 at a position corresponding to roll groove 113. Electrode assembly 12 has a negative tab and a positive tab, and electrode assembly 12 is accommodated in case 11. End cover 13 covers the opening of case 11 and is sealed and connected to case 11. First position-limit portion 112 is used for limiting end cover 13 from moving in a direction facing electrode assembly 12. Current collecting member 14 is configured to connect the negative tab and case 11 so that electrode assembly 12 is electrically connected to case 11. An end of case 11 far from end cover 13 is provided with electrode terminal 16, and electrode terminal 16 is electrically connected to the positive tab.

Current collecting member 14 includes body part 141 and first connecting portion 143. Body part 141 is located on one side of first position-limit portion 112 facing electrode assembly 12 and abuts against first position-limit portion 112. First connecting portion 143 is connected to body part 141, first connecting portion 143 extends to an inner peripheral side of first position-limit portion 112, first connecting portion 143 forms a positioning fit with inner peripheral surface 1121 of first position-limit portion 112, and first connecting portion 143 is welded to inner peripheral surface 1121 of first position-limit portion 112. Inner peripheral surface 1121 of first connecting portion 143 has boundary position 1121a, and a radial dimension of inner peripheral surface 1121 gradually increases from boundary position 1121a to both ends of inner peripheral surface 1121. In a direction that first connecting portion 143 extends from body part 141 in the direction away from electrode assembly 12, the end of first connecting portion 143 away from body part 141 exceeds boundary position 1121a and does not exceed first position-limit portion 112. Body part 141 has inner surface 1411 facing electrode assembly 12 and outer surface 1412 away from electrode assembly 12. First connecting portion 143 is a convex portion extending from outer surface 1412 of body part 141 in the direction away from electrode assembly 12. Current collecting member 14 is provided with concave portion 144, and concave portion 144 is recessed from inner surface 1411 of body part 141 in the direction away from electrode assembly 12. Both the convex portion and concave portion 144 are annular structures extending in a circumferential direction of first position-limit portion 112.

In such battery cell 10, before end cover 13 covers the opening of case 11, the welding of current collecting member 14 and case 11 may be conveniently realized, thereby conveniently realizing the electrical connection of electrode assembly 12 and case 11, ensuring stable and large-area overcurrent between current collecting member 14 and case 11, and ensuring the use performance of battery cell 10.

A manufacturing method for battery cell 10 is provided in an embodiment of the present application. Referring to FIG. 9, FIG. 9 is a flowchart of a manufacturing method for battery cell 10 according to some embodiments of the present application. The manufacturing method includes:

S100: Provide case 11, case 11 having an opening;
S200: Provide electrode assembly 12;
S300: Provide end cover 13;
S400: Provide current collecting member 14;
S500: Connect current collecting member 14 to electrode assembly 12;
S600: Accommodating electrode assembly 12 and current collecting member 14 in case 11; and
S700: Cover the opening of case 11 with end cover 13, and seal and connect end cover 13 to case 11, so that current collecting member 14 is located on a side of electrode assembly 12 facing end cover 13.

Case 11 and electrode assembly 12 are electrically connected through current collecting member 14.

In the above method, the sequence of steps S100, S200, S300, and S400 is not limited. For example, step S400 may be performed first, then step S300 is performed, then step S200 is performed, and then step S100 is performed.

It should be noted that the relevant structure of battery cell 10 manufactured by the manufacturing method provided by the above embodiments may be obtained with reference to battery cell 10 provided by the above embodiments, and will not be repeated here.

In some embodiments, before end cover 13 covers the opening, the manufacturing method further includes welding current collecting member 14 to case 11 from an interior of case 11.

Manufacturing device 2000 for battery cell 10 is further provided in an embodiment of the present application. Referring to FIG. 10, FIG. 10 is a structural diagram of manufacturing device 2000 for battery cell 10 according to some embodiments of the present application. Manufacturing device 2000 includes first providing device 2100, second providing device 2200, third providing device 2300, fourth providing device 2400, and assembling apparatus 2500.

First providing device 2100 is configured to provide case 11, case 11 having an opening. Second providing device 2200 is configured to provide electrode assembly 12. Third providing device 2300 is configured to provide end cover 13. Fourth providing device 2400 is configured to provide current collecting member 14. Assembling apparatus 2500 is configured to connect current collecting member 14 to electrode assembly 12; assembling apparatus 2500 is further configured to accommodate electrode assembly 12 and current collecting member 14 in case 11; assembling apparatus 2500 is further configured to cover the opening with end cover 13 and seal end cover 13 to case 11 so that current collecting member 14 is located on a side of electrode assembly 12 facing end cover 13. Case 11 and electrode assembly 12 are electrically connected through current collecting member 14.

It should be noted that the relevant structure of battery cell 10 manufactured by manufacturing device 2000 provided by the embodiments above may be obtained with reference to battery cell 10 provided by the above embodiments, and will not be repeated here.

It should be noted that in case of no conflicts, the embodiments in the present application and the features in the embodiments may be combined with each other.

The above embodiments are merely used for illustrating the technical solutions of the present application, and are not intended to limit the present application. For those skilled in the art, the present application may have various modifications and changes. Any modifications, equivalent replacements, improvements, and the like made within the spirit and principle of the present application shall fall within the protection scope of the present application.

What is claimed is:

1. A battery cell, comprising:
a case having an opening;
an electrode assembly accommodated in the case;
an end cover covering the opening and sealed and connected to the case; and
a current collecting member accommodated in the case and located on a side of the electrode assembly facing the end cover, wherein the current collecting member is configured to connect the case and the electrode assembly, so that the electrode assembly is electrically connected to the case; and
wherein the electrode assembly comprises a positive electrode tab and a negative electrode tab, the positive electrode tab being located at one end of the electrode assembly and the negative electrode tab being located at the other end of the electrode assembly; and
wherein the case being provided with an electrode terminal at an end away from the end cover, the electrode terminal is insulated from the case and electrically connected to the positive electrode tab; wherein the material of the end cover is the same as the material of the case; and
wherein the battery cell further comprises a sealing member; the end cover and the case are sealed and connected through the sealing member; and
wherein the sealing member is configured to insulate and isolate the case from the end cover,
wherein a first position-limit portion is protruded from an inner side surface of the case, and the first position-limit portion is used for limiting the end cover from moving in a direction facing the electrode assembly; and
wherein the current collecting member comprises:

a body part configured to connect to the electrode assembly, the body part abuts against a side of the first position-limit portion facing the electrode assembly, and the first position-limit portion is used for limiting the body part from leaving the case in a direction away from the electrode assembly; and a first connecting portion connected to the body part, the first connecting portion at least partially extending to an inner peripheral side of the first position-limit portion, and the first connecting portion being welded to the first position-limit portion, wherein the first connecting portion is a convex portion extending from the body part in a thickness direction of the end cover away from the electrode assembly, and the convex portion is used for forming a positioning fit with an inner peripheral surface of the first position-limit portion, the convex portion has an inner peripheral surface facing the electrode assembly and an outer peripheral surface away from the electrode assembly, the inner peripheral surface and the outer peripheral surface are arranged on two opposite sides of the convex portion in a thickness direction of the convex portion, the outer peripheral surface of the convex portion contacts the inner peripheral surface of the first position-limit portion to prevent the convex portion from shaking in a direction perpendicular to the thickness direction of the end cover, a welded joint is formed between the outer peripheral surface of the first connecting portion and the inner peripheral surface of the first position-limit portion.

2. The battery cell according to claim 1, wherein the body part abuts against the side of the first position-limit portion facing the electrode assembly and is welded to the first position-limit portion.

3. The battery cell according to claim 1, wherein the body part has an inner surface facing the electrode assembly and an outer surface away from the electrode assembly, and the convex portion extends from the outer surface in the direction away from the electrode assembly; and the current collecting member further comprises:

a concave portion recessed from the inner surface to the convex portion in the direction away from the electrode assembly.

4. The battery cell according to claim 3, wherein the convex portion and the concave portion are annular structures extending in a circumferential direction of the first position-limit portion.

5. The battery cell according to claim 1, wherein in the thickness direction of the end cover in which the first connecting portion extends from the body part away from the electrode assembly, an end of the first connecting portion away from the body part does not exceed the first position-limit portion.

6. The battery cell according to claim 1, wherein the first connecting portion is welded to the inner peripheral surface of the first position-limit portion through the welded joint, the inner peripheral surface of the first position-limit portion has a boundary position, and a radial dimension of the inner peripheral surface of the first position-limit portion increases gradually from the boundary position to both ends of the inner peripheral surface of the first position-limit portion; and in the direction that the first connecting portion extends from the body part in the direction away from the electrode assembly, an end of the first connecting portion away from the body part exceeds the boundary position.

7. The battery cell according to claim 1, wherein the first position-limit portion is an annular structure extending in a circumferential direction of the case.

8. The battery cell according to claim 1, wherein a roll groove is arranged on an outer side surface of the case at a position corresponding to the first position-limit portion.

9. A battery, comprising a plurality of battery cells according to claim 1.

10. An electrical device, comprising the battery cell according to claim 1.

* * * * *